United States Patent Office 3,453,190
Patented July 1, 1969

3,453,190
ELECTROCHEMICAL ACYLOXYLATION PROCESS
Arthur M. Brownstein, Morristown, N.J., assignor to Princeton Chemical Research, Inc., Princeton, N.J., a corporation of New Jersey
No Drawing. Filed Oct. 19, 1966, Ser. No. 587,675
Int. Cl. C07c *161/04, 119/04;* B01k *1/00*
U.S. Cl. 204—72                                         7 Claims This invention relates to the production of isocyanates and/or isothiocyanates. It more particularly refers to a process for producing intermediates useful in the production of isocyanates and/or isothiocyanates.

It is known that compounds having the general formula:

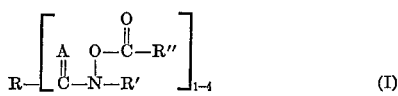
(I)

wherein R, R' and R" can be susbtantially any noninterfering organic residue or hydrogen, at least one of R and R' is hydrogen, and A is either oxygen or sulfur, can be pyrolyzed to isocyanates or isothiocyanates. In the case of acyloxylated primary amides, this pyrolysis rearrangement is called the Lossen rearrangement. The products produced by such pyrolysis have the general formula:

and

It will be appreciated that compounds of general Formula II are extremely valuable to industry as intermediates useful in the formation of urethane-type compounds. It will further be appreciated that compounds of the general Formula III are valuable to industry as solvents for various chemical compounds.

In the special case where compounds of the general Formula I are as follows:

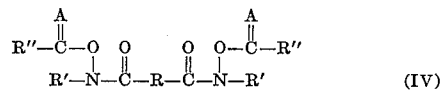

it will be appreciated that diisocyanates or diisothiocyanates are produced which have known utility in producing polyurethanes which themselves have known utility to produce insulating and cushioning materials as well as surface coatings.

Processes are known by which N,N-dimethyl amides can be acyloxylated to insert an acyloxy group onto one of the N-methyl constituents. It would be desirable, however, to provide a process, whereby the acyloxy group could be substituted directly onto the amide nitrogen and thus provide an intermediate from which isocyanates or isothiocyanates could be produced.

It is an object of this invention to provide a novel process for the production of compounds of the general Formula I.

It is another object of this invention to provide a novel process for the production of isocyanates and isothiocyanates.

Other and additional objects of this invention will become apparent from a consideration of this entire specification including the claims appended hereto.

In accord with and fulfilling these objects, one aspect of this invention resides in an electrolytic process, whereby compounds of the Formula I are prepared by the reaction of primary or secondary amides or thioamides with a salt of acarboxylic acid in an aqueous solution in the presence of alternating or direct current. The carboxylic acid salt reactant used in the process of this invention may suitably have an acyloxy group of substantially any number of carbon atom chain length. Thus, for example, the acyloxy group may be derived from carboxylic acids having about 2 to about 22 carbon atoms in straight chain or isomeric configuration. Exemplary of these carboxylic acids are acetic, propionic, butyric, 2-ethyl hexanoic, palmitic and stearic. The metal salt forming portion of the carboxylic acid salt of this invention is suitably an alkali or alkaline earth metal and may be selected from the group consisting of sodium, potassium, lithium, calcium, magnesium, rubidium, cesium, strontium, barium, and radium.

Since the acyloxylated product produced by the electrolytic process of this invention may conveniently be converted by pyrolysis to an isocyanate or isothiocyanate with the potential recovery of the carboxyl moiety of the acyloxylating agent in some form, whereafter the carboxylic acid metal salt used in the acyloxylating process may be reconstituted, it has been found economically desirable to utilize the most readily available and inexpensive acyloxylating agent. Thus, for example, it is preferred in the practice of this invention to utilize acetic, formic or propionic acid salts of sodium, potassium, calcium, or magnesium as the carboxylic acid metal salt acyloxylating agent.

It is within the scope of this invention that the substituent R' may be substantially any organic moiety which is considered desirable in view of the product desired to be obtained. Since in the practice of this invention, the electrolytically obtained products may be desirably used in a further reaction to produce isocyanates or isothiocyanates, the substituent R' in these circumstances is intended to be ultimately cleaved from the original amide molecule, and thus, its composition is not critical to this aspect of the practice of this invention. R' is suitably hydrogen or a hydrocarbon and may be an alkyl, aryl, or cycloalkyl group, as desired, having substantially any chain length. It is preferred in the practice of this invention that R' be hydrogen. It is also, however, within the scope of this invention that R' may be methyl, ethyl, butyl, 2-ethyl hexyl, dodecyl, cyclohexyl, phenyl, alkyl phenyl, or halide phenyl such as, for example, t-butyl-phenyl or 2,4-dichlorophenyl, if it should be desired to use such N-substituted amides herein.

The substituent R may be hydrogen, alkyl, alkylene, cycloalkylene, aryl or arylene, as the case may be. This substituent R will remain as a part of the final product in the situation where the acyloxylated amide of this invention is pyrolytically rearranged to an isocyanate or an isothiocyanate, and therefore, care should be exercised in choosing this reactant with a view toward the properties of the final product isocyanate or isothiocyanate desired. It is further within the scope of this invention that the substituent R may be a moiety containing a hetero atom therein such as, for example, an ether, thioether, amine, or other residue. As will be appreciated from a consideration of Formula I, the substituent R may be mono-, di-, or trivalent. One particularly desirable R-group is tolylene. Other exemplary groups are ethylene, n-hexylene, methyl, hydrogen, phenyl, alkyl phenyl, cyclohexyl, diphenylene methyl, and the like.

The electrolytic reaction process of this invention is suitably carried out in carboxylic acid solution. While such is not imperative, it is preferred to provide the solvent carboxylic acid as the same moiety as the acyloxylating agent. This is preferred in order to simplify purification and resolution of the reaction mass and the reaction product. This carboxylic acid solvent moiety may be defined and exemplified of similar scope to the definition given above for the acid constituent of the acyloxylating agent.

The concentration of metal carboxylate in the reaction medium is suitably about 0.02 to 5 molar, preferably 0.1 to 1.5 molar. The concentration of the oxygen or sulfur containing reactant is suitably about 0.01 to 10 molar, preferably 0.02 to 5 molar.

The process is carried out at about 0 to 100° C., preferably about 15 to 50° C.; and under substantially any pressure considered desirable. Superatmospheric, atmospheric or vacuum operations are equally well suited to use in this invention.

Electrode current densities for use in the process of this invention are conveniently about 0.001 to 10 amperes per square centimeter, preferably about 0.01 to 4 amperes per square centimeter, with an anodic potential of about 0.1 to 2.5, preferably about 0.5 to 2.0, volts. Alternating or direct current can be used equally as well in this process. The electrodes may be made of substantially any suitably conductive, relatively inert material such as, for example, platinum or nickel.

This invention is illustrated by the following examples, which are not to be construed as being in any manner limiting upon the scope thereof.

EXAMPLE I

A jacketed glass reactor fitted with two platinum electrodes (1.3 square centimeter area) was charged with an acetic acid solution containing 1 molar potassium acetate. The temperature of the solution was adjusted to 25° C. and benzamide was added to produce a 0.10 molar concentration. Direct current was passed through the system in a manner such that an anode potential of 1.4 to 1.6 volts was maintained, and the current density was 3.0 amperes per square centimeter. After 2.5 hours, the passage of current was terminated. Hydrogen was evolved at the cathode during the electrolysis. The reaction mixture was diluted 25 percent with water and filtered. The residue contained benzohydroxamic acid acetate. This was heated to 140° C. for three minutes, cooled to 20° C. quickly, and an excess of ethanol was added. Phenylethyl urethane was obtained in good yield.

EXAMPLE II

The procedure of Example I was repeated employing isophthalamide (0.05 M concentration) in place of benzamide. Direct current and an anode potential of 1.6 to 1.75 volts were employed. After three hours the product was worked up as in Example I. The residue contained isophthaloylhydroxamic acid acetate which was pyrolyzed at 200° C., and then treated with excess methanol to form the dimethylurethane of m-phenylenediisocyanate.

EXAMPLE III

The procedure of Example I was repeated employing formanilide (0.80 molar), a current density of 0.5 amperes per square centimeter, and an anode potential of 1.1 to 1.2 volts. After one hour, n-acetoxyformanilide was obtained in good yield.

What is claimed is:
1. Acyloxylation process comprising (1) dissolving a first reactant of the formula

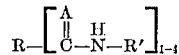

wherein R and R' are selected from the group consisting of hydrogen, alkyl, alkylene, aryl, arylene, cycloalkyl, cycloalkylene, heterocyclo derivatives and heteroaliphatic derivatives, and wherein at least one of R and R' are hydrogen and A is selected from the group consisting of oxygen and sulfur; (2) dissolving as a second reactant a metal salt of a carboxylic acid in an aqueous solution; and (3) passing an electric current through said solution under reaction conditions such that the acyloxy group of said carboxylic acid salt becomes bonded to said amide nitrogen atom.

2. Process as claimed in claim 1, carried out at a temperature of about 0 to 100° C., a current density of about 0.001 to 10 amperes per square centimeter and an anodic potential of about 0.1 to 2.5 volts.

3. Process as claimed in claim 1, carried out at a temperature of about 15 to 50° C., a current density of about 0.01 to 4 amperes per square centimeter and an anodic potential of about 0.5 to 2.0 volts.

4. Process as claimed in claim 2, wherein said R' is selected from the group consisting of hydrogen, alkyl, aryl, cycloalkyl, methyl, ethyl, butyl, 2-ethyl hexyl, dodecyl, cyclohexyl, phenyl, alkyl phenyl, t-butylphenyl and 2,4-dichlorophenyl.

5. Process as claimed in claim 2, wherein said acyloxylated amide product is pyrolyzed to form a member selected from the group consisting of isocyanate and isothiocyanate corresponding to said amide.

6. Process as claimed in claim 2, wherein said R is selected from the group consisting of hydrogen, alkyl, alkylene, cycloalkylene, aryl and arylene.

7. Process as claimed in claim 1, wherein said carboxylic acid is selected from the group consisting of acetic, propionic, butyric, 2-ethyl hexanoic, palmitic and stearic acid residues.

References Cited

UNITED STATES PATENTS 3,252,876   5/1966   Koehl _____ 204—59
3,252,877   5/1966   Koehl _____ 204—59

HOWARD S. WILLIAMS, *Primary Examiner.*

H. M. FLOURNOY, *Assistant Examiner.*